United States Patent
Krueger

(10) Patent No.: US 7,491,765 B2
(45) Date of Patent: Feb. 17, 2009

(54) RUBBER BLEND FOR THE INNER LINER OF VEHICLE TIRES

(75) Inventor: Joern Krueger, Hannover (DE)

(73) Assignee: Continental Aktiengesellschaft, Hannover (DE)

( * ) Notice: Subject to any disclaimer, the term of this patent is extended or adjusted under 35 U.S.C. 154(b) by 0 days.

(21) Appl. No.: 11/829,773

(22) Filed: Jul. 27, 2007

(65) Prior Publication Data

US 2008/0097021 A1    Apr. 24, 2008

Related U.S. Application Data

(63) Continuation of application No. PCT/EP2005/013752, filed on Dec. 21, 2005.

(30) Foreign Application Priority Data

Jan. 28, 2005  (DE) .................. 10 2005 004 031

(51) Int. Cl.
    *C08L 21/00*    (2006.01)
(52) U.S. Cl. .................. 524/451; 524/515; 524/574
(58) Field of Classification Search .................. 524/451, 524/515, 574
    See application file for complete search history.

(56) References Cited

U.S. PATENT DOCUMENTS

| | | | | |
|---|---|---|---|---|
| 5,576,372 A | * | 11/1996 | Kresge et al. | ............... 524/442 |
| 2004/0242731 A1 | * | 12/2004 | Waddell et al. | ............... 524/47 |
| 2004/0242795 A1 | | 12/2004 | Waddell et al. | |

FOREIGN PATENT DOCUMENTS

| | | |
|---|---|---|
| EP | 0832927 | 5/2000 |
| WO | 2005/017013 | 2/2005 |
| WO | 2006/079404 | 8/2006 |

* cited by examiner

*Primary Examiner*—Robert D. Harlan
(74) *Attorney, Agent, or Firm*—Greenblum & Bernstein, P.L.C.

(57) ABSTRACT

A rubber blend containing (a) 40-100 phr (parts by weight based on 100 parts by weight of the total rubber mass) of at least one halobutyl rubber; (b) 5-70 phr of at least one delaminated talc having a BET surface area according to DIN 66131 of 10-40 m²/g, an average particle size ($D_{50}$) of 4-8 μm, determined by laser diffraction measurement, and a lamellarity index of 3-15; and (c) 10-100 phr of at least one carbon black having a CTAB surface area according to ASTM-D 3765 of 10-25 m²/g and a DBP number according to ASTM-D 2414 of 50 to 160 mL/100 g.14. Also, provided are vulcanizates, pneumatic vehicle tires and methods of producing rubber blends.

26 Claims, No Drawings

RUBBER BLEND FOR THE INNER LINER OF VEHICLE TIRES

CROSS-REFERENCE TO RELATED APPLICATIONS

This application is a continuation of International Application No. PCT/EP2005/013752, filed Dec. 21, 2005, and claims priority of German Patent Application No. 10 2005 004 031.4, filed Jan. 28, 2005. Moreover, the disclosures of International Patent Application No. PCT/EP2005/013752 and German Patent Application No. 10 2005 004 031.4 are expressly incorporated by reference herein in their entireties.

BACKGROUND OF THE INVENTION

1. Field of the Invention

The invention relates to a rubber blend, in particular for the inner liner of pneumatic vehicle tires. The invention furthermore relates to pneumatic vehicle tires having an inner liner which is based on such a rubber blend.

2. Discussion of Background Information

In tubeless pneumatic vehicle tires, an inner liner which is as impermeable to air as possible and arranged radially on the inside, also referred to as inner core or inner plate, ensures that the air pumped into the tire does not escape. Escape of air must be counteracted since the escape leads to a reduced pressure in tires which greatly impairs the stability of the tire. Furthermore, the inner liner protects the carcass from the entrance of air and moisture by diffusion. The strength members of the carcass and/or of the belt can be damaged by air and moisture. To ensure that the inner liner remains air-tight, it must also have good resistance to tearing and fatigue so that no tears which impair the air tightness form during driving.

Chlorobutyl rubber or bromobutyl rubber, occasionally as a blend with natural rubber, are usually used as rubbers for the inner liner. These rubber types have a low gas permeability. By metering in bulky fillers having little or no activity, the air tightness can be further increased. These fillers include, for example carbon black of type N 660 and chalk.

EP 0 832 927 B1 discloses a rubber blend for inner liners of pneumatic vehicle tires which contains nonactivated silica as a filler. The use of layered silicate for inner liners of pneumatic vehicle tires is described in U.S. Pat. No. 5,576,372.

By metering in inactive fillers, such as chalk or other fillers having a layer structure or lamellar structure, the air tightness of the inner liner can be further improved but the tearing and fatigue properties are simultaneously adversely affected thereby.

SUMMARY OF THE INVENTION

It is the object of the present invention to provide rubber blends, in particular for the inner liner of pneumatic vehicle tires, whose vulcanizates are distinguished by good air tightness in combination with improved resistance to tearing and fatigue. By the use of such a blend for the inner liner of pneumatic vehicle tires, tires having improved stability are obtained.

This object is achieved, according to the invention, if the rubber blend contains 40-100 phr (parts by weight based on 100 parts by weight of the total rubber mass) of at least one halobutyl rubber, up to not more than 60 phr of at least one further rubber selected from the group consisting of butyl rubber, polybutadiene, styrene-butadiene copolymer, 3,4-polyisoprene, cis-1,4-polyisoprene, natural rubber, styrene-isoprene copolymer and styrene-isoprene-butadiene terpolymer, 5-70 phr of at least one delaminated talc having a BET surface area according to DIN 66131 of 10-40 $m^2/g$, an average particle size ($D_{50}$) of 4-8 μm, determined by laser diffraction measurement, and a lamellarity index of 3-15, and 10-100 phr of at least one carbon black having a CTAB surface area according to ASTM-D 3765 of 10-25 $m^2/g$ and a DBP number according to ASTM-D 2414 of 50 to 160 mL/100 g.

The present invention can provide a rubber blend containing:

(a) 40-100 phr (parts by weight based on 100 parts by weight of the total rubber mass) of at least one halobutyl rubber;

(b) 5-70 phr of at least one delaminated talc having a BET surface area according to DIN 66131 of 10-40 $m^2/g$, an average particle size ($D_{50}$) of 4-8 μm, determined by laser diffraction measurement, and a lamellarity index of 3-15; and (c) 10-100 phr of at least one carbon black having a CTAB surface area according to ASTM-D 3765 of 10-25 $m^2/g$ and a DBP number according to ASTM-D 2414 of 50 to 160 mL/100 g.

The rubber blend can comprise 10-40 phr of the at least one delaminated talc.

The rubber blend can comprise 30-60 phr of the at least one carbon black.

The at least one carbon black can have CTAB surface area according to ASTM-D 3765 of 14-24 $m^2/g$ and a DBP number according to ASTM-D 2414 of 70 to 90 ml/100 g.

The rubber blend can further include up to not more than 60 phr of at least one further rubber selected from butyl rubber, polybutadiene, styrene-butadiene copolymer, 3,4-polyisoprene, cis-1,4-polyisoprene, natural rubber, styrene-isoprene copolymer and styrene-isoprene-butadiene terpolymer.

The present invention also provides an inner liner of a pneumatic vehicle tire comprising a rubber blend according to the present invention.

The present invention also provides a vulcanizate comprising a vulcanized rubber blend according to the present invention.

The present invention also provides a pneumatic vehicle tire having an inner liner which is based on a rubber blend according to the present invention.

The present invention also provides a method for producing a rubber blend, a vulcanized rubber blend, an inner liner, and a pneumatic vehicle tire having an inner liner which is based on a rubber blend according to the present invention.

DETAILED DESCRIPTION OF THE PRESENT INVENTION

The phr (parts per hundred parts of rubber by weight) information used in this document is the quantity information usual in the rubber industry for blend formulations. The metering of the parts by weight of the individual substances is always based on 100 parts by weight of the total mass of all rubbers present in the blend.

Surprisingly, the air tightness of the vulcanizates can be increased and at the same time the resistance to tearing and fatigue can be improved using the special combination of delaminated talc with the carbon black in the stated amounts in a halobutyl rubber blend.

This effect was not to be expected since the mixing in of lamellar fillers, such as talc, is as a rule accompanied by a substantial deterioration in the resistance of the vulcanizates to tearing.

The rubber blend according to the invention additionally has the advantage that the degree of filling in the internal mixer can be increased by the use of talc. This leads to an increase in capacity and hence a reduction in production costs.

The halobutyl rubbers used in the rubber blend may be chloro- or bromobutyl rubber, which can be used as freshly produced rubbers but also as regenerated (recycled) material.

The rubber blend according to the invention can, in addition to the halobutyl rubbers, also contain up to 60 phr of a further rubber selected from butyl rubber, polybutadiene, styrene-butadiene copolymer, 3,4-polyisoprene, cis-1,4-polyisoprene, natural rubber, styrene-isoprene copolymer and styrene-isoprene-butadiene terpolymer.

The rubber blend contains 5-70 phi, preferably 10-40 phr, of at least one delaminated talc which is distinguished by a BET surface area according to DIN 66131 of 10-40 $m^2$/g and an average particle size ($D_{50}$) of 4-8 µm, measured by means of laser diffraction of coherent light. The lamellarity index of the talc is 3-15 and is a measure of the talc morphology, i.e., of the degree of delamination (delamination of the layers). For the same fineness of the talc (determined by laser diffraction), a higher lamellarity index indicates a higher talc structure. The lamellarity index is determined by the following formula:

$$\text{lamellarity index} = \frac{(\text{particle size from laser diffraction}) - (\text{particle size from sedimentation})}{(\text{particle size from sedimentation})}$$

For the determination of the particle size by sedimentation, a SediGraph 5100 particle size measuring apparatus from Micromeritics Instruments, Germany, was used. A talc having the abovementioned property can be prepared, for example, in the wet process according to U.S. Pat. No. 6,348,536 B1.

Furthermore, the rubber blend contains 10-100 phr of at least one carbon black having a CTAB surface area according to ASTM-D 3765 of 10-25 $m^2$/g and a DBP number according to ASTM-D 2414 of 50 to 160 ml/100 g. Such carbon blacks are distinguished by a relatively large particle size and have little reinforcing effect. It is possible to use a plurality of carbon blacks as a mixture.

Particularly good air tightness and resistance to tearing of the vulcanizates in combination with good processability of the blend can be achieved if the blend contains 30 to 60 phr of the carbon black.

By the use of a carbon black having a CTAB surface area according to ASTM-D 3765 of 14-24 $m^2$/g and a DBP number according to ASTM-D 2414 of 70 to 90 mL/100 g the resistance to tearing and the resistance to fatigue can be particularly greatly improved.

In addition to the above-discussed substances, the rubber blend according to the invention may contain customary rubber additives in customary amounts. These substances include, for example, plasticizers, antiaging agents, activators, such as, for example, zinc oxide and fatty acids (e.g. stearic acid), waxes, resins, chalk and mastication auxiliaries.

The vulcanization is carried out in the presence of sulfur or sulfur donors, where some sulfur donors can simultaneously act as vulcanization accelerators. Sulfur or sulfur donors are added to the rubber blend in the last mixing step in the amounts customary for the person skilled in the art.

Furthermore, the rubber blend may contain vulcanization-influencing substances, such as vulcanization accelerators, vulcanization retardants and vulcanization activators, in customary amounts in order to control the required time and/or the required temperature of the vulcanization and to improve the vulcanizate properties. The vulcanization accelerators may be selected, for example, from the following accelerator groups: thiazole accelerators, such as, for example, benzothiazyl disulfide (MBTS), sulfenamide accelerators, such as, for example, benzothiazyl-2-cyclohexylsulfenamide (CBS), guanidine accelerators, such as, for example, N,N'-diphenylguanidine (DPG), dithiocarbamate accelerators, such as, for example, zinc dibenzyldithiocarbamate, and disulfides. The accelerators can also be used in combination with one another.

The preparation of the rubber blend according to the invention is effected in a conventional manner, as a rule a base mixture which contains all constituents with the exception of the vulcanization system (sulfur and vulcanization-influencing substances) first being prepared in one or more mixing stages and the final mixture subsequently being produced by addition with the vulcanization system. The blend is then further processed, for example by a calendar process, and is brought into the appropriate form. The blend is preferably brought into the form of an inner liner which, in tire construction, is calendered in the customary manner and applied to the drum. The final tire blank is then vulcanized.

EXAMPLES

The invention is to be explained in more detail with reference to comparative working examples, which are summarized in Tables 1 and 2.

In the case of all blend examples contained in Table 1, the stated quantity data are parts by weight which are based on 100 parts by weight of total rubber (phr). The comparative blends are characterized by C and the blend according to the invention is characterized by I.

The blend preparation was effected under customary conditions in two stages in a laboratory tangential mixer. The blends were adjusted to approximately the same hardness since a principal requirement with regard to the inner liner blend is a Shore A hardness of less than 50. In the case of a greater hardness, tears would occur in the inner liner during operation. The reaction times until the relative degrees of crosslinking of 10, 40 and 90% ($t_{10}$, $t_{40}$, $t_{90}$) were achieved or determined by monitoring the vulcanization process by means of a rotorless vulcameter according to DIN 53 529. Furthermore, the Mooney viscosities of the blends have been determined according to DIN 53523 using a shearing disk viscometer at 100° C. Test specimens were produced from all blends by vulcanization for 15 minutes under pressure at 160° C., and material properties which are typical for the rubber industry and are listed in Table 2 were determined using these test specimens. The following test methods were used for the tests on test specimens:

- tensile strength at room temperature according to DIN 53 504
- elongation at break at room temperature according to DIN 53 504
- stress values at 100, 200 and 300% elongation at room temperature according to DIN 53 504
- fracture energy density determined in the tensile test according to DIN 53 504, the fracture energy density being the work required until fracture, based on the volume of the sample
- Shore A hardness at room temperature according to DIN 53 505
- resilience at room temperature according to DIN 53 512
- air permeability according to DIN 53 536 at 70° C. air temperature Monsanto fatigue test (fatigue to failure tester) at 136% elongation and room temperature De Mattia test for crack pattern and crack growth according to DIN 53 522 at room temperature

TABLE 1

| Constituents | Unit | 1(C) | 2(C) | 3(C) | 4(I) |
|---|---|---|---|---|---|
| Bromobutyl rubber | phr | 100 | 100 | 100 | 100 |
| Carbon black A[a] | phr | 59 | 39 | — | — |
| Carbon black B[b] | phr | — | — | 81 | 54 |
| Delaminated talc[c] | phr | — | 30 | — | 30 |
| Plasticizer | phr | 20 | 20 | 20 | 20 |
| Magnesia | phr | 0.5 | 0.5 | 0.5 | 0.5 |
| Stearic acid | phr | 2 | 2 | 2 | 2 |
| Zinc stearate | phr | 2.5 | 2.5 | 2.5 | 2.5 |
| Zinc oxide | phr | 3 | 3 | 3 | 3 |
| Accelerator | phr | 1 | 1 | 1 | 1 |
| Sulfur | phr | 0.4 | 0.4 | 0.4 | 0.4 |

[a] Carbon black A: Type N 660
[b] Carbon black B: Carbon black having a CTAB surface area of 19 $m^2/g$ and a DBP number of 79 mL/100 g
[c] Talc having a BET surface area of 22.3 $m^2/g$, an average particle size ($D_{50}$) of 5.9 μm and a lamellarity index of 4.4

TABLE 2

| Properties | | Unit | 1(C) | 2(C) | 3(C) | 4(I) |
|---|---|---|---|---|---|---|
| $t_{10}$ | | min | 1.66 | 1.78 | 1.20 | 1.64 |
| $t_{40}$ | | min | 3.66 | 3.68 | 2.44 | 3.05 |
| $t_{90}$ | | min | 9.28 | 11.95 | 9.02 | 12.03 |
| Mooney ML 1 + 4 | | — | 51.9 | 41.4 | 54.5 | 47.8 |
| Tensile strength | | MPa | 7.0 | 6.3 | 5.2 | 5.5 |
| Elongation at break | | % | 850 | 917 | 807 | 848 |
| Stress value 100% | | MPa | 0.69 | 0387 | 0.71 | 0.93 |
| Stress value 200% | | MPa | 1.28 | 1.32 | 1.28 | 1.43 |
| Stress value 300% | | MPa | 2.2 | 1.82 | 2.09 | 2 |
| Fracture energy density | | — | 25.9 | 24.5 | 20.0 | 21.5 |
| Hardness | | Shore A | 43.4 | 43.9 | 44.4 | 47.1 |
| Resilience | | % | 12.1 | 12.4 | 11.6 | 11.9 |
| Air permeability | | $m^2$/Pa·s | $7.6 \cdot 10^{-17}$ | $4.7 \cdot 10^{-17}$ | $6.3 \cdot 10^{-17}$ | $4.4 \cdot 10^{-17}$ |
| Monsanto fatigue | | kcycles | 455 | 499 | 838 | 1560 |
| De Mattia crack pattern | 4000 cycles | level | — | — | — | — |
| | 8000 cycles | level | — | — | 0.5 | — |
| | 16 000 cycles | level | — | — | 0.5 | 0.5 |
| | 32 000 cycles | level | — | — | 0.5 | 0.5 |
| | 64 000 cycles | level | — | — | 0.5 | 1 |
| | 128 000 cycles | level | 0.5 | — | 0.5 | 1.5 |
| | 256 000 cycles | level | 0.5 | — | 0.5 | 1.5 |
| | 512 000 cycles | level | 0.5 | — | 0.5 | 1.5 |
| | 1 024 000 cycles | level | 2.5 | 1.5 | 1 | 1.5 |
| | 2 000 000 cycles | level | 6 | 6 | 2 | 2 |
| De Mattia crack growth | 4 000 cycles | cm | — | — | — | — |
| | 8 000 cycles | cm | — | — | — | — |
| | 16 000 cycles | cm | — | — | — | — |
| | 32 000 cycles | cm | — | — | — | — |
| | 64 000 cycles | cm | — | — | — | — |
| | 128 000 cycles | cm | — | 2.7 | — | — |
| | 256 000 cycles | cm | 3.3 | 4.3 | 2.4 | 3.1 |
| | 512 000 cycles | cm | 62 | 7.5 | 3.4 | 4.9 |
| | 1 024 000 cycles | cm | 11.9 | 12.8 | 5.6 | 7.4 |
| | 2 000 000 cycles | cm | 20.1 | 22.6 | 9.9 | 10.4 |

The tables show that only by the combination of delaminated talc with the special carbon black (blend 4(I)) is it possible to obtain a blend whose vulcanizates have a high air tightness (air permeability<$4.5 \cdot 10^{-17}$ $m^2$/(Pa·s)), and at the same time the resistance to fatigue is increased to an extent which goes far beyond an additive effect and was not to be expected. Cracking and crack growth are likewise at a very low level. In particular, the resistance to fatigue in the case of cyclic elongation determined by the Monsanto fatigue tester has been improved to a considerable degree. In blends 2 and 3, which do not contain the combination of talc and carbon black according to the invention, such high fatigue resistances are not achieved.

What is claimed is:

1. A rubber blend containing:
   (a) 40-100 phr (parts by weight based on 100 parts by weight of the total rubber mass) of at least one halobutyl rubber;
   (b) 5-70 phr of at least one delaminated talc having a BET surface area according to DIN 66131 of 10-40 $m^2/g$, an average particle size ($D_{50}$) of 4-8 μm, determined by laser diffraction measurement, and a lamellarity index of 3-15; and
   (c) 10-100 phr of at least one carbon black having a CTAB surface area according to ASTM-D 3765 of 10-25 $m^2/g$ and a DBP number according to ASTM-D 2414 of 50 to 160 mL/100 g.

2. The rubber blend as claimed in claim 1, comprising 10-40 phr of the at least one delaminated talc.

3. The rubber blend as claimed in claim 1, comprising 30-60 phr of the at least one carbon black.

4. The rubber blend as claimed in claim 2, comprising 30-60 phr of the at least one carbon black.

5. The rubber blend as claimed in claim 1, wherein the at least one carbon black has CTAB surface area according to ASTM-D 3765 of 14-24 m²/g and a DBP number according to ASTM-D 2414 of 70 to 90 ml/100 g.

6. The rubber blend as claimed in claim 2, wherein the at least one carbon black has CTAB surface area according to ASTM-D 3765 of 14-24 m²/g and a DBP number according to ASTM-D 2414 of 70 to 90 ml/100 g.

7. The rubber blend as claimed in claim 3, wherein the at least one carbon black has CTAB surface area according to ASTM-D 3765 of 14-24 m²/g and a DBP number according to ASTM-D 2414 of 70 to 90 ml/100 g.

8. The rubber blend as claimed in claim 4, wherein the at least one carbon black has CTAB surface area according to ASTM-D 3765 of 14-24 m²/g and a DBP number according to ASTM-D 2414 of 70 to 90 ml/100 g.

9. The rubber blend according to claim 1 further including up to not more than 60 phr of at least one further rubber selected from butyl rubber, polybutadiene, styrene-butadiene copolymer, 3,4-polyisoprene, cis-1,4-polyisoprene, natural rubber, styrene-isoprene copolymer and styrene-isoprene-butadiene terpolymer.

10. The rubber blend according to claim 2 further including up to not more than 60 phr of at least one further rubber selected from butyl rubber, polybutadiene, styrene-butadiene copolymer, 3,4-polyisoprene, cis-1,4-polyisoprene, natural rubber, styrene-isoprene copolymer and styrene-isoprene-butadiene terpolymer.

11. The rubber blend according to claim 3 further including up to not more than 60 phr of at least one further rubber selected from butyl rubber, polybutadiene, styrene-butadiene copolymer, 3,4-polyisoprene, cis-1,4-polyisoprene, natural rubber, styrene-isoprene copolymer and styrene-isoprene-butadiene terpolymer.

12. The rubber blend according to claim 4 further including up to not more than 60 phr of at least one further rubber selected from butyl rubber, polybutadiene, styrene-butadiene copolymer, 3,4-polyisoprene, cis-1,4-polyisoprene, natural rubber, styrene-isoprene copolymer and styrene-isoprene-butadiene terpolymer.

13. The rubber blend according to claim 5 further including up to not more than 60 phr of at least one further rubber selected from butyl rubber, polybutadiene, styrene-butadiene copolymer, 3,4-polyisoprene, cis-1,4-polyisoprene, natural rubber, styrene-isoprene copolymer and styrene-isoprene-butadiene terpolymer.

14. An inner liner of a pneumatic vehicle tire comprising a rubber blend as claimed in claim 1.

15. A vulcanizate comprising a vulcanized rubber blend according to claim 1.

16. A vulcanizate comprising a vulcanized rubber blend according to claim 4.

17. A vulcanizate comprising a vulcanized rubber blend according to claim 2.

18. A vulcanizate comprising a vulcanized rubber blend according to claim 3.

19. A pneumatic vehicle tire having an inner liner which is based on a rubber blend as claimed in claim 1.

20. A pneumatic vehicle tire having an inner liner which is based on a rubber blend as claimed in claim 2.

21. A pneumatic vehicle tire having an inner liner which is based on a rubber blend as claimed in claim 3.

22. A pneumatic vehicle tire having an inner liner which is based on a rubber blend as claimed in claim 4.

23. A method of producing a rubber blend comprising combining:
   (a) 40-100 phr (parts by weight based on 100 parts by weight of the total rubber mass) of at least one halobutyl rubber;
   (b) 5-70 phr of at least one delaminated talc having a BET surface area according to DIN 66131 of 10-40 m²/g, an average particle size ($D_{50}$) of 4-8 μm, determined by laser diffraction measurement, and a lamellarity index of 3-15; and
   (c) 10-100 phr of at least one carbon black having a CTAB surface area according to ASTM-D 3765 of 10-25 m²/g and a DBP number according to ASTM-D 2414 of 50 to 160 mL/100 g.

24. The method as claimed in claim 23, wherein the rubber blend is vulcanized.

25. The method as claimed in claim 24, wherein the vulcanized rubber blend is formed into an inner liner.

26. The method as claimed in claim 25, wherein the inner liner is included in a pneumatic vehicle tire.

* * * * *